(12) United States Patent
Sterling et al.

(10) Patent No.: US 11,154,949 B2
(45) Date of Patent: *Oct. 26, 2021

(54) SYSTEM, APPARATUS AND METHOD FOR HYBRID FUNCTION MICRO WELDING

(71) Applicant: Jabil Inc., St. Petersburg, FL (US)

(72) Inventors: William Douglas Sterling, Pleasanton, CA (US); Chao Su, Pleasanton, CA (US); Gongen Gu, San Ramon, CA (US)

(73) Assignee: JABIL INC., St. Petersburg, FL (US)

( * ) Notice: Subject to any disclaimer, the term of this patent is extended or adjusted under 35 U.S.C. 154(b) by 214 days.

This patent is subject to a terminal disclaimer.

(21) Appl. No.: 16/154,872

(22) Filed: Oct. 9, 2018

(65) Prior Publication Data
US 2019/0039180 A1    Feb. 7, 2019

Related U.S. Application Data

(63) Continuation of application No. 14/749,130, filed on Jun. 24, 2015, now Pat. No. 10,099,315.

(60) Provisional application No. 62/018,516, filed on Jun. 27, 2014.

(51) Int. Cl.
| | |
|---|---|
| *B23K 26/00* | (2014.01) |
| *B23K 26/21* | (2014.01) |
| *B23K 35/02* | (2006.01) |
| *B23K 26/36* | (2014.01) |
| *B23K 101/38* | (2006.01) |

(52) U.S. Cl.
CPC ............. *B23K 26/21* (2015.10); *B23K 26/36* (2013.01); *B23K 35/0272* (2013.01); *B23K 2101/38* (2018.08)

(58) Field of Classification Search
CPC ............ B23K 2201/38; B23K 2201/42; B23K 26/20–22; B23K 26/24–244; B23K 26/36; B23K 35/40; B23K 35/0272
USPC .......................................... 219/121.6–121.83
See application file for complete search history.

(56) References Cited

U.S. PATENT DOCUMENTS

| | | | | |
|---|---|---|---|---|
| 4,626,653 A | * | 12/1986 | Sciaky ................... | B23K 26/08 219/121.63 |
| 5,498,850 A | * | 3/1996 | Das ....................... | A24F 47/008 219/121.66 |
| 5,532,434 A | * | 7/1996 | Takeno .................. | B23K 26/18 174/110 A |
| 7,453,345 B2 | * | 11/2008 | Bednarek ............... | H01H 69/02 337/186 |
| 10,099,315 B2 | * | 10/2018 | Sterling ............. | B23K 35/0272 |
| 2002/0144984 A1 | * | 10/2002 | Mori .................... | B23K 26/244 219/121.64 |

(Continued)

*Primary Examiner* — Sang Y Paik
(74) *Attorney, Agent, or Firm* — Thomas J. McWilliams; Barnes & Thornburg LLP

(57) ABSTRACT

An apparatus, system and method for micro welding, wherein insulated object, such as a wire, that includes a metallic conductor that is at least partially covered by one or more layers of insulation, is positioned across a termination point. A laser beam may be applied to an area of the insulated object overlapping the termination point, wherein the applied laser beam is configured to substantially simultaneously (i) ablate the one or more layers of insulation in a first region of the area, (ii) weld the metallic conductor to the termination point in a second region of the area, and (iii) detach a portion of the object from the termination point in a third region of the area.

20 Claims, 4 Drawing Sheets

(56) References Cited

U.S. PATENT DOCUMENTS

2004/0133298 A1* 7/2004 Toyserkani .......... B23K 26/032
  700/166
2013/0105450 A1* 5/2013 Waldhoer ............. B23K 26/348
  219/121.64

* cited by examiner

SYSTEM, APPARATUS AND METHOD FOR HYBRID FUNCTION MICRO WELDING

CROSS-REFERENCE TO RELATED APPLICATIONS

The present application is a continuation application of U.S. Non-Provisional application Ser. No. 14/749,130, filed Jun. 24, 2015, entitled "System, Apparatus and Method for Hybrid Function Micro Welding," which claims priority to U.S. Provisional Application Ser. No. 62/018,516, filed Jun. 27, 2014, entitled "Hybrid Micro-Welding Process."

BACKGROUND

Field of the Disclosure

The present disclosure is generally directed to micro welding, and more specifically to technologies and techniques for attaching components, such as wire, using controlled removal and fusion of material using energy such as laser applied in the disclosed exemplary manners to strip, weld and cut fine gage wires to connection points in a single operational step.

Description of the Background

The term "micro welding" typically refers to the precise placement of connective metals and the application of energy to form welds that may be less than 100 μm wide. Usually performed under a microscope for accuracy, the actual welding process in some cases may be similar to normal welding, but on a much smaller scale. In most high-volume industrial settings, micro welding may be automated, requiring little input from an operator, but some specialty or irregular welds may require a highly-trained technician.

Known micro welding techniques include resistance micro welding, flash micro welding, arc micro welding and laser micro welding. The practice of stripping and preparing insulated wires for the production of electronic devices is also known and widely practiced. A very large number of electronic devices, such as electric motor transformer inductors and the like, place special demands on the conductive wires and the quality of workmanship, since the wires typically are wound or overlaid in large numbers, must possess thin and highly durable coatings with adequate thermal conductivity, and provide adequate resistance to heat damage and insulation breakdown. While the wire coatings are designed to insulate and protect the wires, the coatings may be difficult to strip and prepare for effective attachment to other components, and/or require multi-step processes to both strip and prepare the wires, as referenced above.

A wide variety of coating-removal techniques have been devised and these removal methods include scraping, abrasive removal, chemical removal and burning or ablating with thermal sources including hot solder, flames and lasers. Each of these methods possesses certain disadvantages, such as scratching or nicking the wire. Thermal annealing of the wire may render the stripped wire more vulnerable to breakage as it is subsequently formed in preparation for soldering or welding. Typically, such preparation is performed by twisting or wrapping or clamping the stripped wire to a terminal prior to soldering. After attachment, the resulting connection may continue to be weak and less reliable.

In addition, special wire insulation materials have been developed to retract or burn off when exposed to molten solder. However, the wires in such instances remain at risk of damage from the solder itself, at least because the increased exposure time of the wire exposed during the solder stripping process. Further, as the insulation is removed by exposure to molten solder, a chemical reaction between the tin in the solder and the copper in the wire may degrade the mechanical strength and electrical conductivity of the joint. The drawbacks of the aforementioned insulation removal techniques are particularly present for very small gage wires, such as AWG 30 and smaller.

The above drawbacks are greatly increased for small gage wires because the volume of insulation coating material is large as compared to the underlying wire. Furthermore, the surface area of the wire is large compared to the volume of the wire, which increases the rate of chemical reaction with the solder and thereby risks loss of strength and conductivity during the attachment process.

In a conventional assembly process, even if there were no degradation of the wire by the stripping process, prior to soldering the prepared wire the stripped wire must be mechanically formed to attach it to a termination point, typically by winding the wire around the termination or securing by various clips or clamping attachments. The process of mechanically securing the wires requires additional process steps which add to the complexity, time and expense of the assembly process.

This present disclosure improves the process of attaching insulated ultra-fine wires by eliminating processing steps, reducing handling time, and achieving equivalent or better mechanical and electronic characteristics in the attachment process to known methods by employing systems and methods that are suitable for automation and high volume production.

SUMMARY

Accordingly, in illustrative embodiments, an apparatus, system and method is disclosed for micro welding, comprising positioning an insulated wire comprising one or more layers of insulation across a termination point; and heating an area of the wire and termination point via a laser to substantially simultaneously generate a plurality of different heating regions in the area, wherein a first region is heated by the laser to ablate the one or more layers of insulation, a second region is heated by the laser to weld a first portion of the wire to the termination point, and a third region is heated by the laser to melt detach a second portion of the wire proximate to a boundary of the termination point.

In illustrative embodiments, an apparatus, system and method is disclosed for micro welding, comprising positioning an insulated wire comprising one or more layers of insulation across a termination point; applying a laser beam to an area of the insulated wire and the termination point, wherein the applied laser beam: ablates the one or more layers of insulation in a first region of the area, welds the wire to the termination point in a second region of the area, and detaches the wire from the termination point in a third region of the area.

In further illustrative embodiments, an apparatus, system and method is disclosed for micro welding, comprising positioning an insulated object comprising a metallic conductor at least partially covered by one or more layers of insulation across a termination point; applying a laser to an area of the insulated object overlapping the termination point, wherein the applied laser: ablates the one or more layers of insulation in a first region of the area, welds the metallic conductor to the termination point in a second region of the area, and detaches a portion of the object from the termination point in a third region of the area.

BRIEF DESCRIPTION OF THE FIGURES

The present disclosure will become more fully understood from the detailed description provided herein below in conjunction with the accompanying drawings, which are given by way of illustration only and which thus do not limit the present disclosure, and in which.

DETAILED DESCRIPTION

Figure 1:
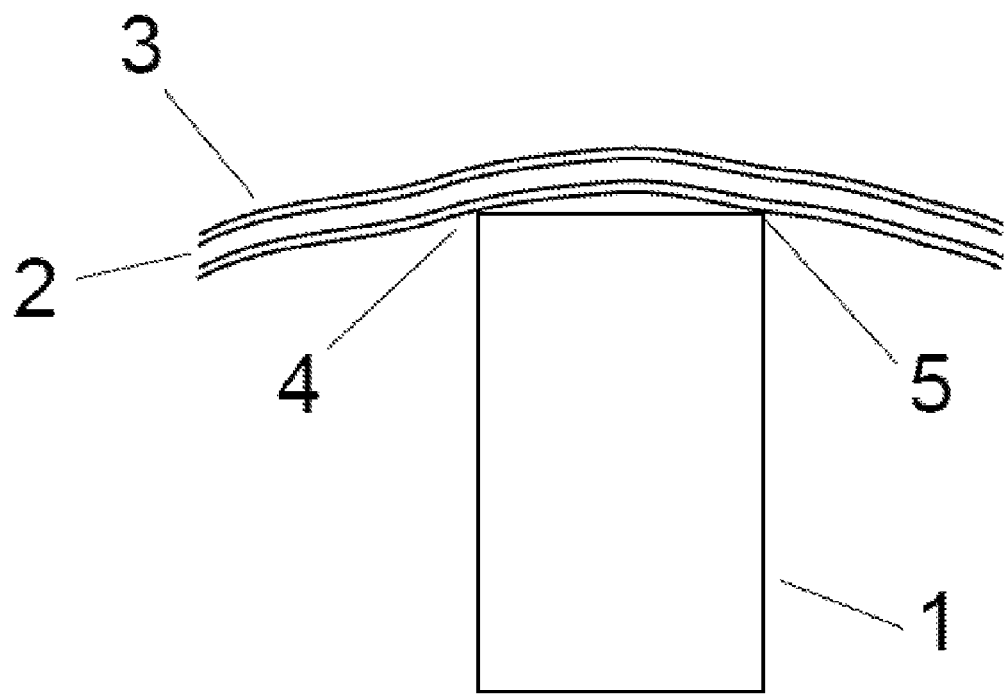
FIG. 1 shows an insulated wire in cross section placed on a termination inside view under an illustrative embodiment.

The figures and descriptions provided herein may have been simplified to illustrate aspects that are relevant for a clear understanding of the herein described devices, systems, and methods, while eliminating, for the purpose of clarity and brevity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and/or because they do not facilitate a better understanding of the present disclosure, a discussion of such elements and operations may not be provided herein. However, the present disclosure is deemed to include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may be introduced but may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," "having," and the like are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to," "coupled to," or the like with respect to another element or layer, it may be directly on, engaged, connected or coupled to the other element or layer, or intervening elements or layers may be present. In contrast, when an element is referred to as being "directly on," "directly engaged to", "directly connected to," "directly coupled to," or the like with respect to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Thus, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

In various embodiments discussed herein, various systems, methods, and techniques are disclosed to strip, weld and cut an insulated wire in relation to a terminal in a common or single process step. In an illustrative embodiment, this may be achieved by controlling absorbed laser energy to achieve a thermal distribution that will ablate the wire insulation in one region only, and transition to another region where the wire will weld to a termination surface. In an illustrative embodiment, the process may further transition to another region where the wire will melt and separate, thus leaving an intact wire at one side of the termination, attaching the wire to the termination, and removing the wire at the other side of the termination. It can be appreciated by those skilled in the art that the techniques disclosed herein allow an object, such as an insulated wire, to be micro welded to another object, while also thermally cutting or detaching a portion of the wire, and while at least partially ablating the insulation on a portion of the wire, all in one step and occurring substantially simultaneously, or in a series of steps. It should be understood by those skilled in the art that, depending on the laser intensity, the nature and thermal conductivity of the material used, and the type of insulation used, the simultaneous nature of the welding/ ablation/cutting processes may be slightly or significantly affected (e.g., by fractions of a second or seconds).

By way of non-limiting example, multiple (e.g., three) heating regions discussed herein may be achieved by a combination of the laser radiation distribution onto the area of intersection of the positioned wire and termination, the focal area and angle of the laser radiation, and the conduction of laser-induced heating of the wire into the termination surface, in combination sufficient to keep the wire temperature within a range suitable for welding in a portion, ablation of the insulation at a portion, and a region at the edge of the termination whereat the wire will continue to increase in temperature to the melting point of the wire (due to a lower thermal conduction into the edge of the termination) and thereby detach from the termination at the boundary of the termination surface. The relative difference in the thermal masses of the wire and the termination, the degree of contact between the wire and the termination, the materials used, the susceptibility of the materials to the laser wavelengths used, and/or the tension on the wire may affect processing specifics, e.g., laser intensity, wavelength, exposure time, etc. For example commonly used magnet wires may be insulated with various coatings that can be removed thermally in a range of about 155° C. to 220° C. The underlying wire (e.g., copper) may have a melting point around 1085° C., and a common termination material (e.g., phosphor-bonze) may have a melting point of approximately 1050° C. and/or may be coated with tin, which has a melting point near 231° C.

The entire process can be controlled by advantageous selection of the laser power distribution, the point and angle of application of the laser radiation, and the material properties of the wire, wire insulation and termination material properties, in addition to the geometry of the wire and termination. If the required precision of the exposure is high, the process can be further enhanced by optically monitoring the material reaction, which may detect optical intensity changes characteristic of ablation of the insulation, flowing of the metals, and wire separation using the detected optical feedback compared to a characteristic response waveform, to thereby allow for control of the exposure. The separation of the wire during the exposure process may be further enhanced by maintaining the wire tension across the termination within an optimized range.

Turning to FIG. 1, an illustrative embodiment is shown, where a metallic termination point 1 is overlaid with an insulated wire (shown in cross section) including a metallic conductor 2 coated with one or more layers of insulation 3. In an illustrative embodiment, the wire is positioned or arranged to contact the termination 1 at one or more points, shown as points 4 and 5 in this example.

Figure 2:
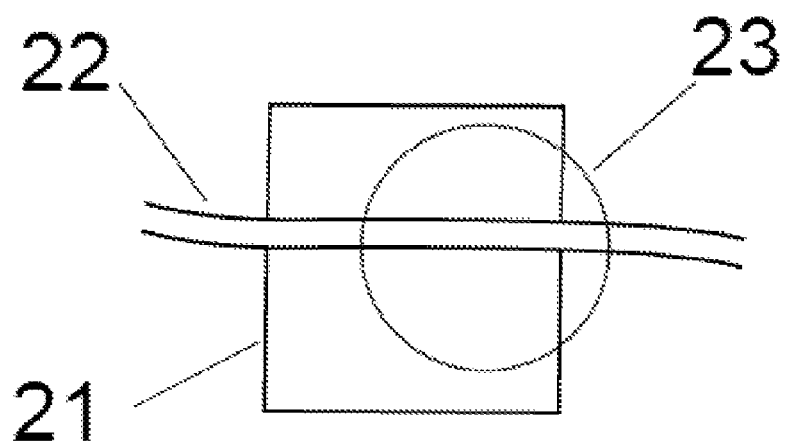
FIG. 2 shows a top view of an insulated wire laid across a termination with a circular laser beam footprint overlay under an illustrative embodiment.

FIG. 2 shows the illustrative embodiment of FIG. 1 from a top view where a termination surface 21 is provided, which may be flat or otherwise formed (e.g., a groove), as is at least one overlying insulated wire 22. From this angle, a laser beam 23 may be aimed to overlap with both the wire 22 and termination surface 21. In one example, the laser beam 23 may be provided at an intensity sufficient to ablate the insulation and heat wire 22 and termination surface 21 to a temperature sufficient to weld the metal of the wire 22 to the termination 21.

The laser beam 23 can be of any wavelength suitable for the heating of the materials, preferably between 500 nm and 1300 nm, or 532 nm, or 1060 nm. The laser used for the laser beam may be a solid-state laser (e.g., diode pumped laser, ruby laser, neodymium-doped yttrium aluminium garnet (Nd:YAG) laser) or a gas laser having a high power density (e.g., 1 MW/cm$^2$) that produces small heat-affected zones and high heating and cooling rates. The spot size of the laser may vary, such as between 0.2 mm and 13 mm, although the smaller sizes may be preferable for welding. During operation, the depth of penetration of the laser may be proportional to the amount of power supplied, but may be also dependent on the location of the focal point, where penetration may be maximized when a focal point of the laser is slightly below the surface of the work piece (e.g., wire/termination surface). In some embodiments, a continuous or pulsed laser beam may be used. Millisecond-long pulses may be used to weld thinner materials, while continuous laser application may be employed for deeper welds.

The laser disclosed herein may further be employed to perform ablation, which is a process for removing material from a surface (e.g., insulation on the wire) by irradiating it with a laser beam. At low laser flux, the material is heated by the absorbed laser energy and evaporates or sublimates. At high laser flux, the material may be converted to a plasma. In some illustrative embodiments, laser ablation may include removing material with a pulsed laser, while in other illustrative embodiments material may be ablated with a continuous wave laser beam of a high intensity. The size, intensity and intensity distribution of the laser beam 23, together with the specific heat of the wire and termination, may produce a non-uniform heat distribution over the surface of the wire and termination, as further detailed in FIG. 3.

Figure 3:
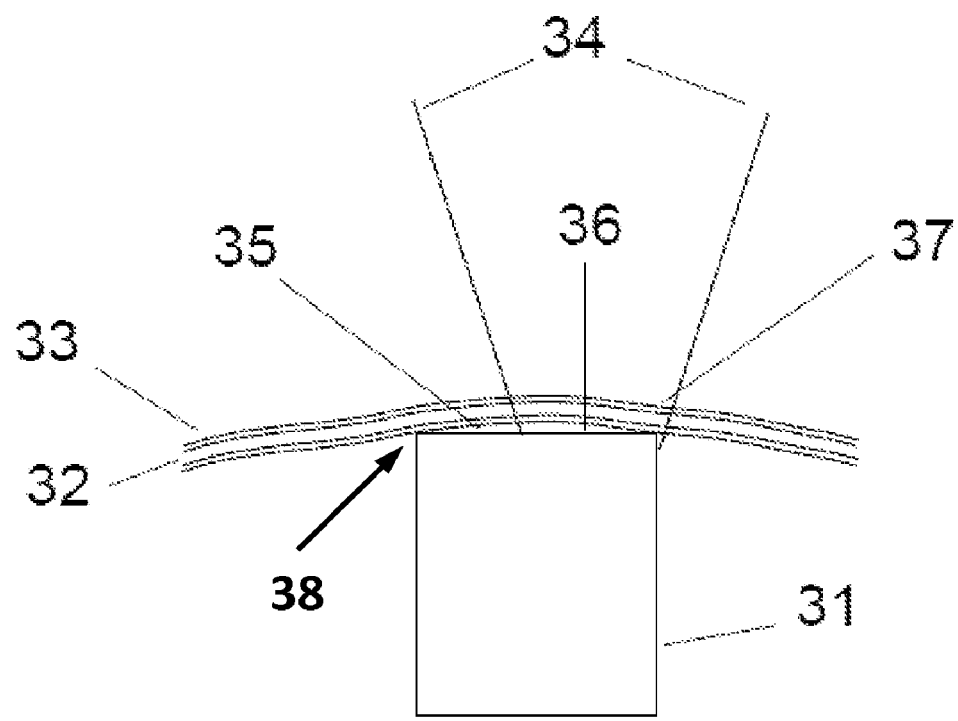
FIG. 3 shows a side view of an insulated wire placed on a termination with an overlaid laser beam path under an illustrative embodiment.

Turning to FIG. 3, a side view is provided of the embodiment illustrated in FIG. 2. In this example, laser beam 34 is shown as a cone of light which converges to create the beam footprint (23) shown in FIG. 2. Laser beam 34 may be of a wavelength and power level that heats the wire insulation 33, the underlying wire 32 and termination 31. In one illustrative embodiment, laser beam 34 may be aimed in a manner to achieve different temperature maximums at different points across the surface of wire 32 and termination 31 sufficient to achieve a plurality of different material changes. In an illustrative embodiment, a laser may be aimed at an edge (37) of termination 31 and may be also angled to create an asymmetrical beam across the area to create higher heat at the edge (37) to weld and cut the wire (32), while using the conducted heat along wire 32 to ablate the insulation 33 at a region (38) that may be outside the focus of the laser beam 34.

In a first region 35 near the laser beam 34, but not directly exposed to the laser beam 34, the heating may occur by thermal conduction along wire 32 from the heating in a second region 36. In the first region 35, insulation material 33 may be thermally removed by conducted heat that may reach temperatures sufficient to achieve insulation ablation (e.g., greater than 155° C.) but below a typical welding temperature (e.g., at least 1085° C. for metals such as copper). In second region 36, near the center of laser beam 34, both the wire 32, 33 and termination 31 may be directly exposed to laser beam 34 and heated beyond the ablation temperatures to the required welding temperatures of the wire and the termination material (e.g., at least 1085° C. for metals such as copper), but heating may be limited by thermal conduction into the volume of the termination 31 and the total integrated laser power from achieving significantly higher temperatures. A third region 37 at the edge of laser beam 34 may be heated to at least a welding temperature, or higher temperatures such as due to thermal limiting via conduction into the termination being less efficient at the boundary of the termination, and accordingly the peak temperature at third region 37 may be high enough to melt and detach the wire (such as due to the lower viscosity of the melt or tension on the wire, or both). The termination process thus produces a welded wire at one portion of the terminal, and detaches the excess wire at the other side of the terminal.

Figure 4:
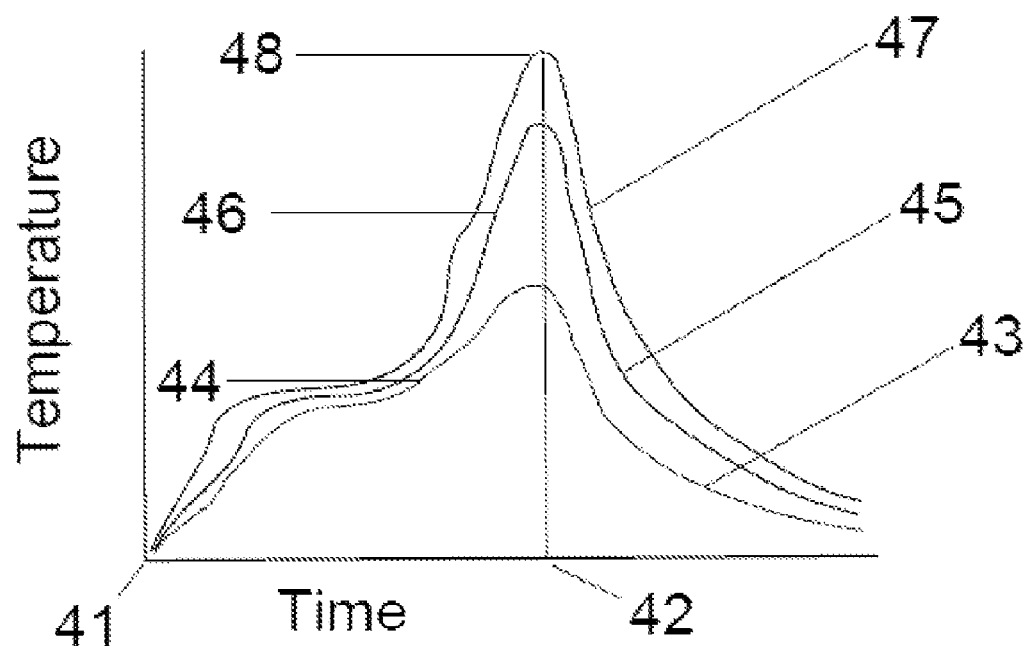
FIG. 4 shows simulated waveforms of temperature versus position achieved at various points along a wire and a termination as a result of laser exposure under an illustrative embodiment.

In FIG. 4, a simulated waveform plot of laser exposure time on the horizontal axis versus temperature on the vertical axis illustrates the different heating zones previously described in FIG. 3. In the illustrative embodiment of FIG. 4, laser exposure begins at the time indicated at 41 and ends at the time indicated 42. The curve 43 illustrates a time evolution of temperature at a point in region 35, discussed in relation to FIG. 3. Curve 43 shows that this region (35) reaches a temperature level 44 sufficient to ablate the wire insulation, but does not reach the welding threshold temperature 46.

A second curve 45 of FIG. 4 illustrates a time evolution of temperature at a point in region 36, illustrated in FIG. 3. Curve 45 shows that this region reaches a temperature level 46 sufficient to weld the wire to the terminal. A third curve 47 illustrates the time evolution of temperature at a point in region 37, illustrated in FIG. 3. The curve 47 shows that this region reaches a temperature level in a range equal to or greater than curve 46, and up to a temperature level 48 at which the wire may separate from the terminal as a result of decreased viscosity of the melted wire and/or tension on the wire.

Figure 5:
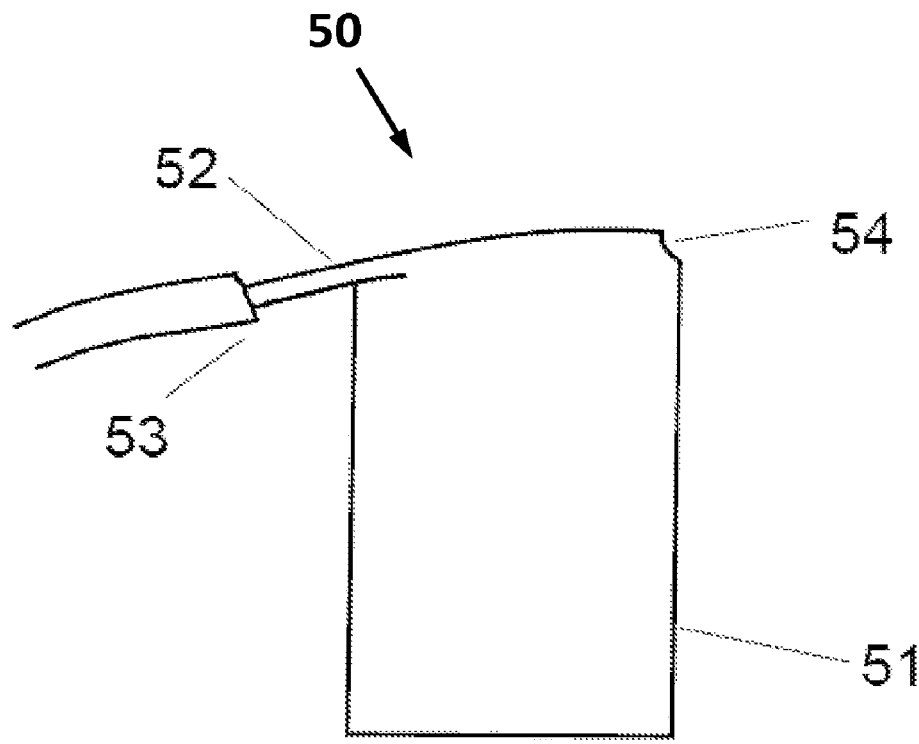
FIG. 5 shows a side view of a welded termination under an illustrative embodiment.

In the illustrative embodiment of FIG. 5, a welded part 50 is shown in side view, where termination 51 is now fused to wire 52, and insulation 53 has been ablated over a range where direct laser heating and/or heat spread via conduction has reached the ablation temperature. In this example, area 54 is illustrated as the point at which the wire has detached from the termination during the weld.

Figure 6:
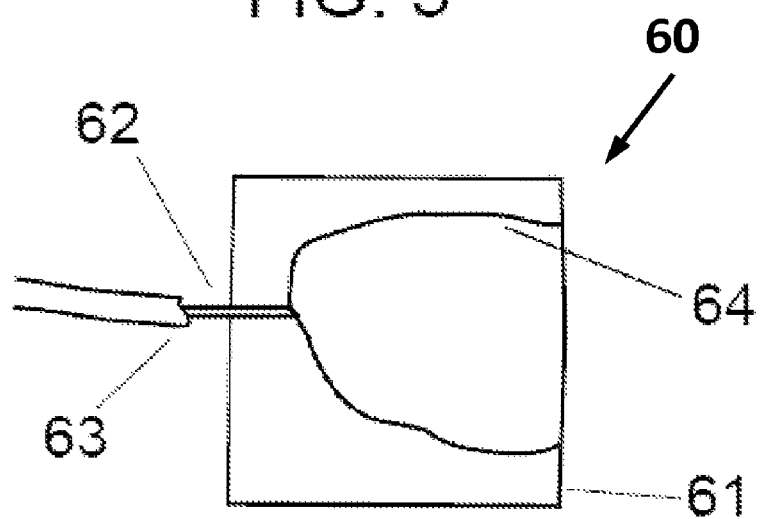
FIG. 6 shows a top view of a welded termination under an illustrative embodiment.

In the illustrative embodiment of FIG. 6 a welded part 60 is shown in top view, where a termination 61 is now fused to wire 62. In this example, the insulation 63 has been ablated over a range where direct laser heating and heat spread via conduction has reached an ablation temperature. The region bounded by 64 is illustrated here as the area where laser heating has reached the required welding temperature.

Figure 7:
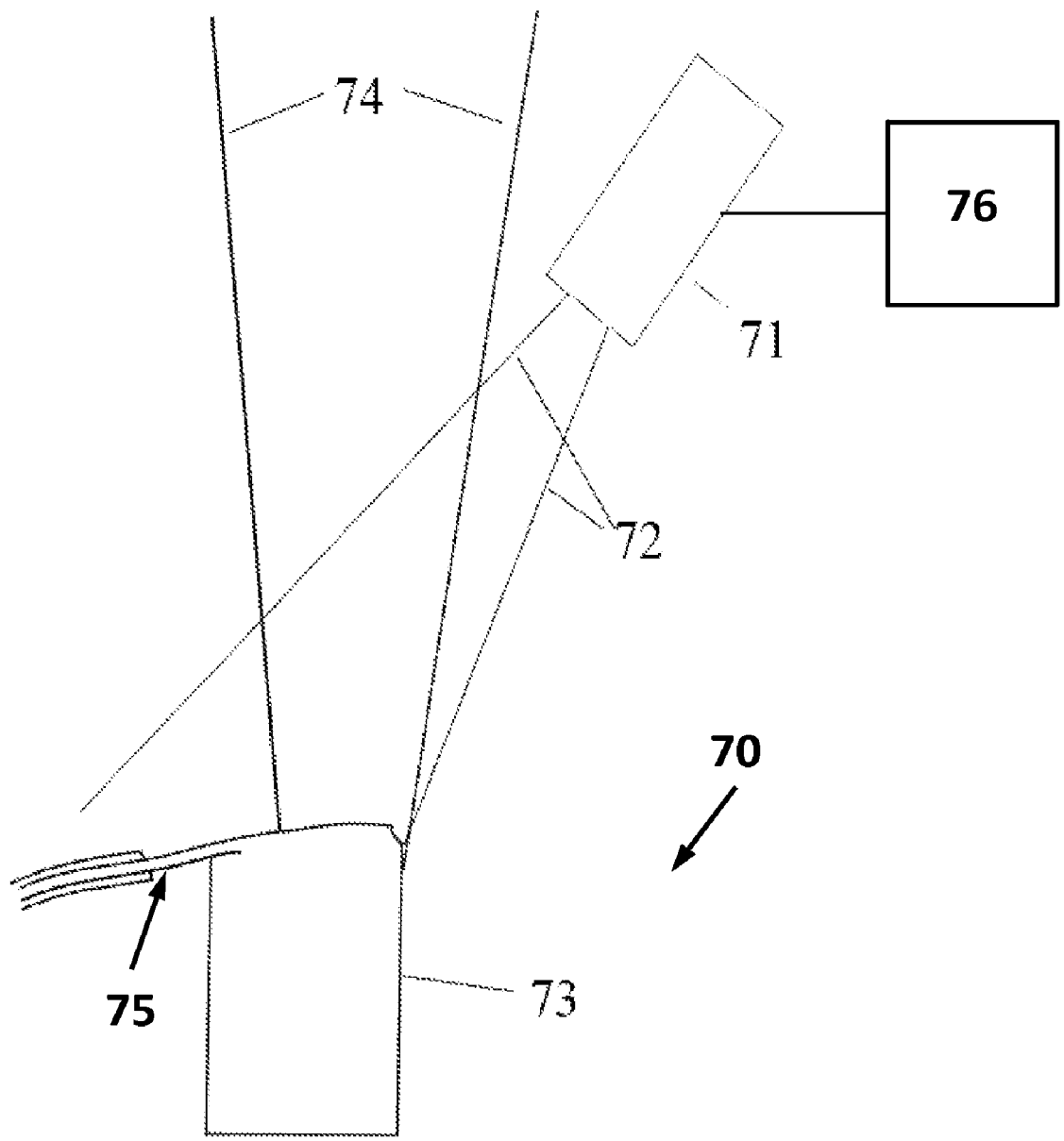
FIG. 7 shows a side view of an insulated wire placed on a termination with an overlaid laser beam path with an optical detector directed at a welding site under an illustrative embodiment.

In the illustrative embodiment of FIG. 7, the control of the welding process may be enhanced by an optical monitor 71 that may produce a signal responsive to the reflected intensity of the light from the wire and termination being processed 72. Wire 75, fused to the termination 73, is shown during exposure to the laser light 74. The changing pattern of the detected light 72 collected by the optical monitor 71 may then be transmitted to a programmable controller, such as a computer 76, for processing and comparison to a pre-determined response pattern, such as to indicate the completion of the weld, wherein the controller may terminate the laser exposure thereafter. Of course, the computer 76 may be microprocessor-based, and may include stored instructions in a memory associated with the processor that, when executed by the processor, cause to be provided the processing and comparison discussed above, and which may additionally cause to be provided networking capabilities, one or more graphical user interfaces (GUIs), and the like.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A method for micro welding, comprising:
   positioning an insulated wire, having a metallic conductor and one or more layers of insulation, proximate to a termination point; and
   asymmetrically heating an area comprising the insulated wire and at least a portion of the termination point via an angled, single step laser shot to substantially simultaneously generate a plurality of asymmetrical heating regions in the area, wherein a first of the heating regions at least partially ablates the one or more layers of insulation, a second of the heating regions welds the metallic conductor to the termination point, and a third of the heating regions detaches a detachment portion of the wire.

2. The method of claim 1, further comprising controlling the angle of the laser shot based on an optically assessment of the heating regions.

3. The method of claim 1, wherein the area comprises at least an edge of the termination point.

4. The method of claim 1, wherein the heating the area comprises heating the first of the heating regions via conductive heat outside a focus of the laser shot.

5. The method of claim 4, wherein the heating the area comprises heating the second of the heating regions and the third of the heating regions via a focus of the laser shot.

6. The method of claim 1, wherein the heating the area comprises heating via the laser shot having a wavelength between 500 nm and 1300 nm.

7. The method of claim 1, wherein the laser shot comprises a solid state laser.

8. A method for micro welding, comprising:
   positioning an insulated wire, comprising one or more layers of insulation, across a termination point;
   angularly applying a laser beam to an area of the insulated wire and the termination point, wherein the applied laser beam is applied in a single operational process step to asymmetrically heat the area to:
      ablate the one or more layers of insulation in a first region of the area,
      weld the wire to the termination point in a second region of the area, and
      detach the wire from the termination point in a third region of the area.

9. The method of claim 8, further comprising controlling the angle of the laser beam based on an infrared assessment of the regions.

10. The method of claim 8, wherein the area comprises an edge of the termination point.

11. The method of claim 10, wherein the applied laser beam further heats the first region via conductive heat outside a focus of the laser beam.

12. The method of claim 11, wherein the applied laser beam further heats the second region and the third region via the focus of the laser beam.

13. The method of claim 8, wherein the applied laser beam comprises a wavelength between 500 nm and 1300 nm.

14. The method of claim 8, wherein the applied laser beam comprises a solid state laser.

15. A micro welded apparatus, comprising:
- an insulated object, comprising a metallic conductor at least partially covered by one or more layers of insulation, wherein the insulated object is asymmetrically heated to partially ablate, weld and detach to a termination point by a single angled laser shot to an area of the insulated object overlapping the termination point, wherein the angled laser shot substantially simultaneously (i) ablates the one or more layers of insulation in a first region of the area, (ii) welds the metallic conductor to the termination point in a second region of the area, and (iii) detaches a portion of the object from the termination point in a third region of the area.

16. The apparatus of claim 15, further comprising a computer-driven infrared monitor suitable to monitor the first, second and third regions.

17. The apparatus of claim 15, wherein the area comprises an edge of the termination point.

18. The apparatus of claim 15, wherein the applied laser shot heats the first region via conductive heat outside a focus of the laser.

19. The apparatus of claim 18, wherein the applied laser shot heats the second region and the third region via the focus of the laser.

20. The apparatus of claim 15, further comprising a computer-driven optical monitor suitable to monitor the first, second and third regions.

* * * * *